United States Patent [19]

Leiber

[11] 4,370,715
[45] Jan. 25, 1983

[54] ANTI-LOCK CONTROL SYSTEM
[75] Inventor: Heinz Leiber, Leimen, Fed. Rep. of Germany
[73] Assignee: Robert Bosch GmbH, Stuttgart, Fed. Rep. of Germany
[21] Appl. No.: 229,366
[22] Filed: Jan. 29, 1981

Related U.S. Application Data

[63] Continuation of Ser. No. 886,310, Mar. 13, 1978, abandoned.

[30] Foreign Application Priority Data

Mar. 29, 1977 [DE] Fed. Rep. of Germany ....... 2713828

[51] Int. Cl.³ .............................................. B60T 8/10
[52] U.S. Cl. .................................. 364/426; 303/106; 303/109
[58] Field of Search .................... 364/426; 303/20, 97, 303/106, 107, 109, 111; 188/181 C

[56] References Cited

U.S. PATENT DOCUMENTS

| | | | |
|---|---|---|---|
| 3,754,797 | 8/1973 | Rodi et al. | 188/181 C X |
| 3,795,425 | 3/1974 | Marouby | 303/106 |
| 3,811,739 | 5/1974 | Nakamura et al. | 188/181 C X |
| 3,832,008 | 8/1974 | Leiber et al. | 303/109 |
| 3,877,755 | 4/1975 | Carp et al. | 303/106 |
| 3,909,070 | 9/1975 | Leiber | 303/109 |
| 3,909,071 | 9/1975 | Klatt | 303/20 X |
| 3,964,796 | 6/1976 | Bremer | 303/107 |
| 4,006,942 | 2/1977 | Saito | 303/106 X |
| 4,036,537 | 7/1977 | Fleagle | 303/106 |

*Primary Examiner*—Jerry Smith
*Attorney, Agent, or Firm*—Edwin E. Greigg

[57] ABSTRACT

The invention concerns an anti-lock control system for braking vehicle wheels having a pickup element to determine the wheel velocity. An evaluating circuit connected to the output of the pickup element produces control signals for varying the fluid pressure in the braking system if the signals corresponding to the wheel velocities deviate by predetermined threshold values from the signals corresponding to the curve of the vehicle speed. Switching apparatus containing timing elements is provided which respond along the lines of a pressure reduction when the pressure control unit is initiated and then effect, for a short time, a switchover of the control. Furthermore, control signals are produced only in case of deviations by more than the maximum threshold value. Finally, testing apparatus is included which determines, after the threshold value has become effective, when the initiating signal disappears and which then maintains the switchover condition for a predetermined longer period of time.

4 Claims, 1 Drawing Figure

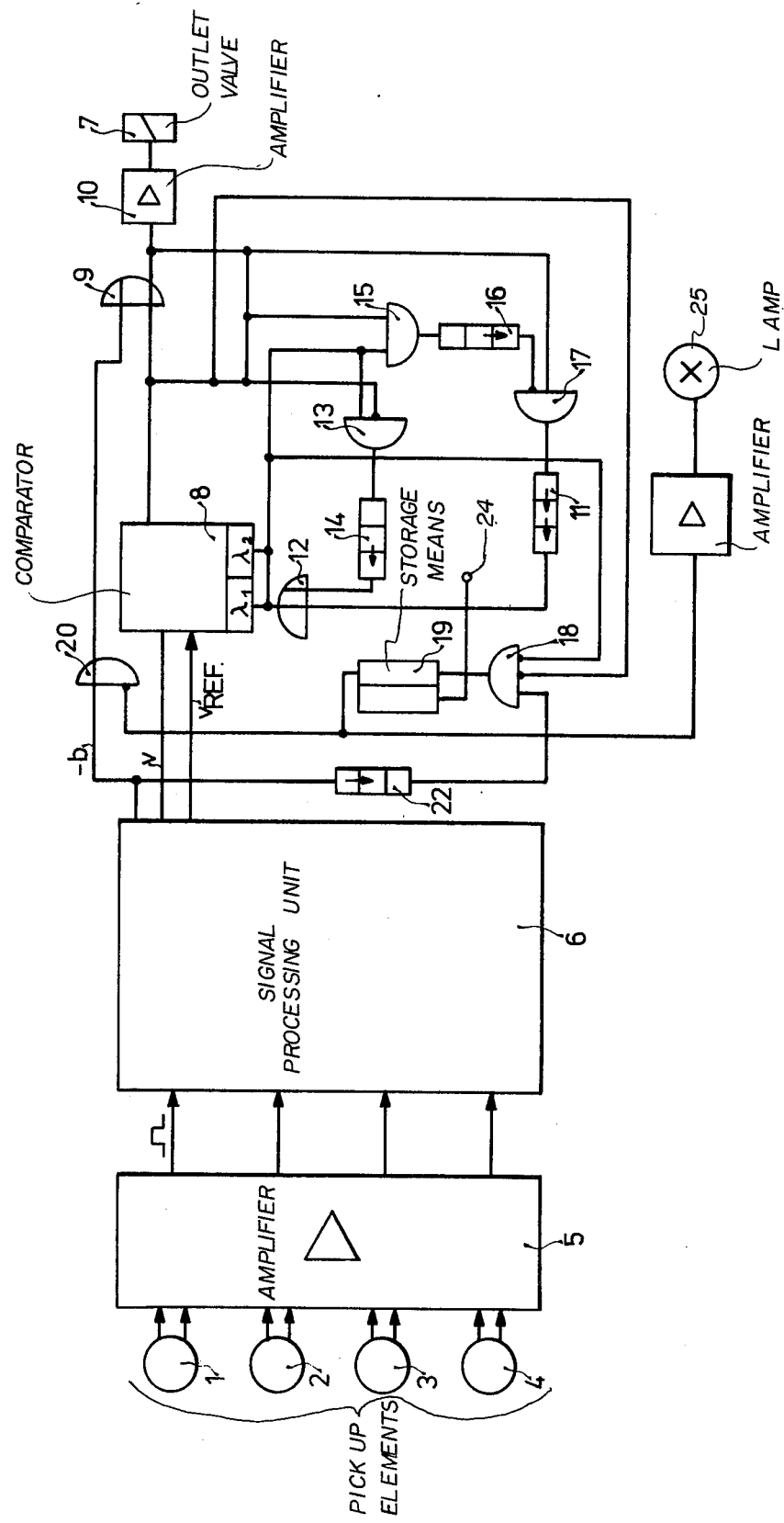

ANTI-LOCK CONTROL SYSTEM

This is a continuation, of application Ser. No. 886,310 filed Mar. 13, 1978 and now abandoned.

BACKGROUND OF THE INVENTION

The invention relates to an anti-lock control system for the braking of wheeled vehicles wherein one pickup element to determine the speed of rotation of a wheel is associated at least with the wheels of one vehicle axle. In an evaluating circuit to which signals from the pickup elements are transmitted, control signals are alternatively produced for the pressure control units associated with the wheels to vary the brake pressure. If the signals corresponding to the wheel velocities deviate the predetermined threshold values $\lambda_1$ or $\lambda_2$ from the reference signals corresponding to the curve of the vehicle velocity, a control signal is normally produced when the value falls below the smaller threshold value $\lambda_1$.

Such an anti-lock control system is known from DOS (German Unexamined Laid-Open Application) No. 2,063,944. In FIG. 2 of this reference, the small slip threshold is normally switched on. If this threshold is exceeded, then the pressure is lowered and after a predetermined time $\Delta T$, the switchover is effected to the large slip threshold. Once the large slip threshold has also been exceeded, the pressure is further lowered until the large pressure threshold has again been passed in the downward direction. In contrast thereto, if the wheel slip remains in the range defined by the two slip thresholds, then the lowering signal terminates with the switchover to the large slip threshold.

In case of slip control arrangements, the reference signal representing the vehicle speed is customarily taken from the wheel velocities, wherein the most rapidly revolving wheel determines the value of the speed reference signal. With a predetermined, small slip value, when the vehicle traverses a tight curve the rotational speed of the wheel on the inside of the curve is so much lower than the reference signal determined by the wheel on the outside of the curve that a wheel slip is simulated for the wheel on the inside of the curve corresponding to $\lambda_1$ having been exceeded, and accordingly a brake fluid pressure lowering signal is produced. On the other hand, it is desirable to have the small slip threshold $\lambda_1$ effective initially to insure a response of the control unit even in case of low vehicle speeds.

OBJECT AND SUMMARY OF THE INVENTION

The present invention has as its object, improving the above-described anti-lock control system so that the undesired lowering of the pressure is avoided in the special case discussed.

This objective is attained in accordance with the invention by providing switching means having timing elements which respond, upon initiation of the pressure control unit, to effect a pressure reduction beyond a predetermined time $T_1$. Thereafter, for a short time, a switchover of the control takes place so that control signals are produced only in case of deviations by more than the larger threshold value $\lambda_2$. Also included are testing means which after the threshold value $\lambda_2$ has become effective, determine whether the initiating signal has disappeared and then maintain the switchover to $\lambda_2$ for a predetermined time $T_2$ which is longer than $T_1$.

Thus, in accordance with the present invention, when a pressure lowering signal lasting a predetermined time $T_1$ (a signal of, for example, 50 msec.) occurs, a switchover is effected to the larger slip threshold and then an examination is made to determine the presence or absence of the pressure lowering signal. If it is still present, this demonstrates that the signal cannot stem from the traversal of a sharp curve since otherwise the second, larger slip threshold could not be reached and consequently, the controller is switched back to its normal control operation. In contrast thereto, if the pressure lowering signal disappears during switchover to the larger slip threshold, then there is the possibility that the slip signal is due to the vehicle rounding a tight curve and for this reason the larger slip threshold is maintained for a time period $T_2$ of, for example, 1 second, so that a further lowering in pressure can only be triggered when this threshold is exceeded, unless this is accomplished by other means such as deceleration signals. If the original pressure lowering signal was not triggered by the traversal of a sharp curve but rather by a genuine wheel slip, then the second threshold will also be exceeded very soon and thus trigger a further lowering of the brake fluid pressure. To improve the effect of the system in case a pressure lowering signal is still present even after switchover of the slip threshold to the larger value, the switching means for changing over to the slip thresholds from $\lambda_1$ to $\lambda_2$ are preferably blocked for a predetermined period of time since it has been determined in this instance that a genuine control condition exists.

If in addition to the slip signal, a wheel deceleration signal is utilized for pressure control, then the deceleration signal can be examined with little added expense and optionally this signal can be suppressed for at least a certain period of time. If, in the presence of a deceleration signal, no slip is present at least after a certain time period, then the deceleration signal must be erroneous and therefore it is then suppressed. For this purpose, a storage means can be provided which is set when the aforementioned conditions occur and such storage means then effects the blockage. The resetting of the storage means should be possible only upon termination of the drive, as for example when the ignition is switched off. A warning device can be coupled with the storage means to indicate such suppression and thus an incorrectness in the system. The switchover from one slip threshold to the other can also be blocked if a pressure lowering signal is produced in the other control channel because in that case there is certainly no triggering due to traversal of a curve by the vehicle.

BRIEF DESCRIPTION OF THE DRAWING

The single FIGURE of drawing is a block diagram of a preferred embodiment of the invention.

DESCRIPTION OF THE PREFERRED EMBODIMENT

Four pickup elements, 1–4, measure the velocities of the four vehicle wheels. The output signals from these pickup elements are separately amplified in an amplifier 5 and then fed to the signal processing unit 6 wherein the reference signal is formed from the four wheel velocity signals. The signal processing unit transmits the signals corresponding to wheel velocity v, wheel deceleration −b, and the reference signal $v_{REF}$ for the individual control channels. The drawing shows only the outputs for one channel. Optionally, acceleration signals can also be produced, but these have not been taken into account here because they are of no importance to the solution of the problem under consideration. As for the valves which actually affect the brake pressure, only an outlet valve 7 has been shown because the type of initiation of the inlet valve is likewise unimportant.

The wheel velocity signals v and the reference signals $v_{REF}$ are fed to a comparator 8 which comprises threshold circuits which can be switched over. The comparator transmits a control signal whenever the wheel velocity signal, depending on the setting, deviates from the reference variable by $\lambda_1$ or by $\lambda_2$ where $\lambda_2 > \lambda_1$. The output signal from the comparator 8 and a deceleration signal $-b$ open the outlet valve 7 by way of the OR gate 9 and the amplifier 10 and thus lower the brake fluid pressure. The normal control operation is known and will not be explained in detail herein.

Normally, the smaller slip threshold $\lambda_1$ is effective in the comparator and whenever this threshold value is exceeded in the downward direction, the comparator produces an output signal. If this signal, or a deceleration signal $-b$, lasts longer than the delay time of the timing element 11, for example 50 msec., then the timing element transmits a brief signal, for example, 20 msec., and thus switches the comparator 8 via the OR gate 12 to the larger slip threshold. If the initiating signal of the outlet valve 7 disappears during this operation, the possibility is assumed that the vehicle is traversing a sharp curve and the timing element 14 is set via the AND gate 13. The timing element 14 then maintains, for one second, for example, the switching condition corresponding to the larger slip threshold $\lambda_2$ in the comparator. In contrast thereto, if the pressure lowering signal does not disappear when switching over to the larger slip threshold by the timing element 11, then the timing element 16 of, for example, 1 second, is set by way of the AND gate 15. The timing element 16 then blocks the AND gate 17 and thus prevents a further switchover to the $\lambda_2$ threshold when, after the the 20 msec. of the timing element 11 have gone by, the switchover is to the $\lambda_1$ threshold. In this case, it can be assumed that the lowering did not occur due to the vehicle traversing a curve of short radius.

Finally, it is possible to determine with little added expense whether a slip control signal is produced upon the occurrence of a $-b$ signal, that is, whether slippage is present. If this is not the case, at least after a certain period of time determined by timing element 22, then the $-b$ signal can be assumed to be false. Therefore, the storage means 19 is set by way of the AND gate 18, which scans the aforementioned conditions. The storage means then blocks the $-b$ signal by means of the OR gate 20 and simultaneously activates a warning lamp 25. The resetting of the storage means takes place via the terminal 24 when the ignition is turned off.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. An anti-lock control system for the hydraulic braking system of a wheeled vehicle, comprising;
    at least one pickup element for generating a wheel speed signal proportional to the speed of a vehicle wheel on at least one vehicle axle;
    an evaluation circuit connected to an output of said pickup element for controlling fluid pressure in the wheel brake cylinders producing a control signal causing a lowering of fluid pressure when a threshold $\lambda_1$ or $\lambda_2$, wherein $\lambda_2 > \lambda_1$, between a vehicle speed reference and the wheel speed proportional signal is passed in the decreasing direction and wherein normally the threshold $\lambda_1$ is effective;
    switching means having timing elements connected thereto, connected to respond to the presence of a brake fluid pressure lowering signal beyond a predetermined time $T_1$ for switching over for a given short time to a control state in which the $\lambda_2$ threshold is effective and thus switching said brake fluid pressure lowering signal only in the event that the differential between the vehicle speed signal and reference signal is greater than said higher threshold $\lambda_2$; and
    testing means operative only when said $\lambda_2$ threshold becomes effective for determining the presence or absence of said pressure lowering signal, said testing means being adapted to maintain the switchover to the $\lambda_2$ threshold for a time period $T_2$ greater than $T_1$ when said pressure lowering signal disappears after the switchover to the $\lambda_2$ threshold.

2. An anti-lock control system according to claim 1, including additional testing means which after switching over to the larger threshold value $\lambda_2$, respond to a pressure lowering signal and then prevent for a predetermined time period $T_3$, a renewed response of the switching means effecting the switchover.

3. An anti-lock control system according to claim 1, wherein the lowering of pressure is also effected by a wheel exceeding a deceleration threshold including switchoff means connected to prevent such signals from causing lowering of the brake fluid pressure from becoming effective at least for a certain period of time if, upon the occurrence of such a signal triggered by deceleration of the vehicle wheel, the activated slip threshold is not exceeded in the downward direction at least after a certain period of time.

4. An anti-lock control system according to claim 3, including storage means which are set upon the occurrence of vehicle wheel deceleration and then block the deceleration signal, said storage means being interlocked with the vehicle ignition so that resetting is possible only after turning off the ignition.

* * * * *